(No Model.)
J. K. STARLEY.
TRICYCLE.
No. 274,231. Patented Mar. 20, 1883.
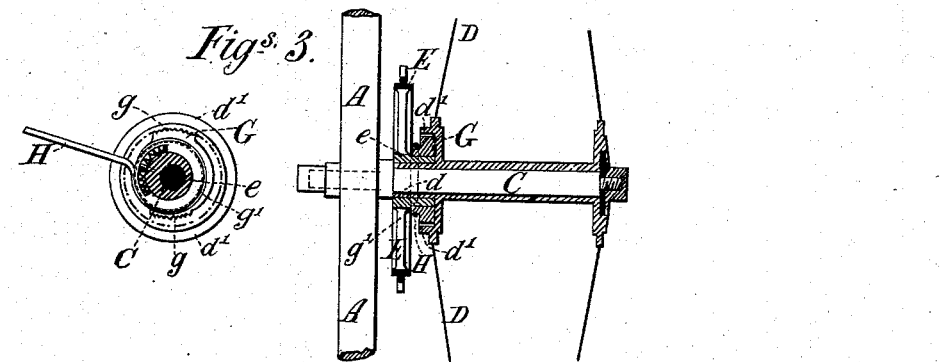
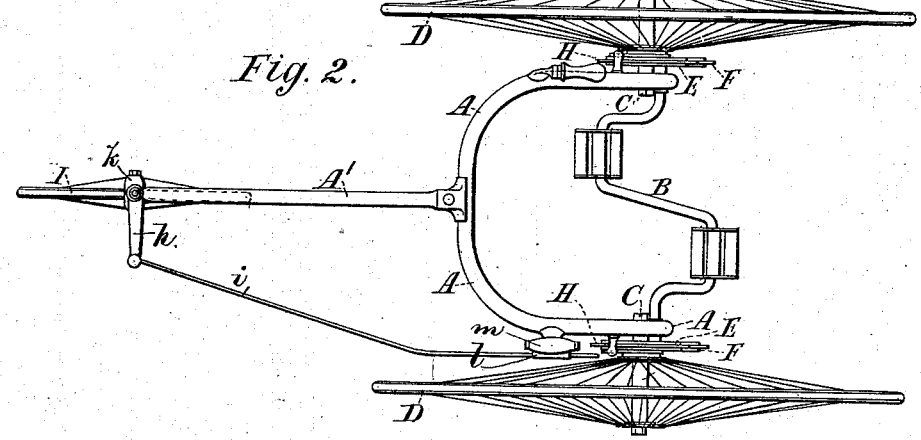
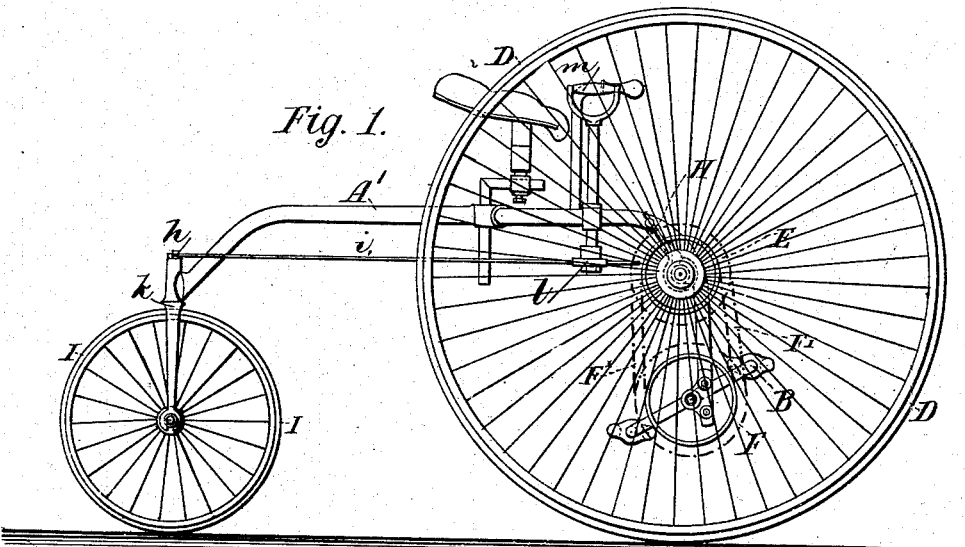
Witnesses
J. Haib
Harold Serrell
Inventor:
John K. Starley
per Lemuel W. Serrell
att

UNITED STATES PATENT OFFICE.

JOHN K. STARLEY, OF COVENTRY, COUNTY OF WARWICK, ENGLAND, ASSIGNOR TO THE COVENTRY MACHINISTS COMPANY, (LIMITED,) OF SAME PLACE.

TRICYCLE.

SPECIFICATION forming part of Letters Patent No. 274,231, dated March 20, 1883.

Application filed November 27, 1882. (No model.) Patented in England December 3, 1880, No. 5,046.

*To all whom it may concern:*

Be it known that I, JOHN KEMP STARLEY, of Coventry, in the county of Warwick, England, have invented certain Improvements in Tricycles, of which the following is a specification.

This invention relates to a novel construction of tricycle in which the two traveling wheels are mounted on an open-fronted bow-frame, and are both driven in such manner that one or other of them will be automatically set free from the driving-power during the act of turning the vehicle.

In the accompanying drawings, Figure 1 shows in side elevation, and Fig. 2 in partial plan view, a tricycle with my invention applied thereto.

In these figures it will be seen that I transmit the motion of the crank or pedal shaft to each of the driving-wheels of the tricycle by a chain and chain-wheels, and that I provide a clutch arrangement for locking each traveling wheel to its chain-wheel.

The frame of the tricycle is made as an open-front bow-frame, A, and spine A', permanently connected together in order to make them the same as one piece. The open-front bow-frame A is carried forward and downward toward the ground, and the ends of said frame are made with bearings for the crank-shaft B, and the stud-axles C C, for receiving the driving or traveling wheels D D, are also placed upon and secured to said bow-frame A, as shown. The spine A' is continued out the required length, and to the end of it is attached the rear steering-wheel. The devices for operating the steering-wheel consist of an arm, *h*, and connecting rod or link *i*, from the pivot of the fork *k* of said wheel to a rack and pinion at *l*, the latter being operated by a handle, *m*. The hubs of these wheels (see the enlarged views, Figs. 3) are cast with a sleeve-extension, *d*, inward or toward the center of the machine, and they have an annular flange, *d'*, on the same side of the hub, furnished with internal V-shaped ratchet-teeth.

Mounted loosely on the sleeve-extension of each hub is a chain-wheel, E, which is in line with the chain-wheel F on the crank-shaft, and is connected therewith by an endless driving-chain, F'. The boss of the chain-wheel E on the side adjacent to the hub is made eccentric, as at *e*, and upon this eccentric is mounted a clutch, G, formed by a disk, which is set within the annular toothed flange of the hub, and is furnished with projecting teeth *g* at its opposite edges to fit the internal teeth of the annular flange. This clutch is made so much smaller in diameter than the flange of the hub that it will only engage with its internal teeth when the greatest eccentricity of the boss on which the disk is mounted is brought toward or in line with the clutch-teeth. Cast on one side of this clutch G is an annular flange, *g'*, for receiving a metal elastic strap, H, which is carried by the frame, and may be made adjustable, its object being to put a slight friction on the flange of the clutch and prevent the clutch from rotating with the chain-wheel until it is locked into the ring of teeth on the hub of the traveling wheel. When this takes place the flange *g'* of the clutch will turn in the elastic strap H, the friction being too slight to interfere with its rotary motion. On starting the vehicle both clutches will come automatically into action, and thus both traveling wheels will be driven; but on turning the vehicle, through the action of the steering-wheel I. (the forked stem of which is carried by the rear end of the frame,) the rotation of one or other of the traveling wheels D will be arrested, and the clutch of the outer wheel will become disengaged from the internal teeth on the hub through the overrunning of that wheel.

To prevent the clutch from working out of place, and to restore it to an intermediate position, I cut a slot in the inner face of the clutch to receive a pin (see Figs. 3) which projects radially from the eccentric *e*, corresponding with its largest radius. In the slot on either side of the pin lies a coiled spring, the pressure of which springs will, immediately the clutch is disengaged from the hub of the wheel D, by their balanced pressures, bring the clutch into the intermediate or non-acting position.

An obvious modification of the clutch arrangement, where the tricycle is provided with a through-shaft for receiving the traveling wheels, is to fit this shaft (which in this case will be driven through a chain-wheel) with a pair of eccentrics to receive the clutches which take into the internal teeth of the hubs of the traveling wheels. In this modification the action will be precisely similar to that above described, for as the steering-wheel is turned, say, to the near side, the outer traveling wheel will overrun its clutch and travel freely in a curve around the near or driven wheel until a straight course is recommenced.

I am aware that a tricycle or velocipede has been made with an oblong frame open in the center and provided with projecting arms, to which the steering-wheel is attached.

I am also aware that a tricycle-frame has been constructed of several pieces connected together and secured to the axles of the wheels, and that one of these pieces forms the main axle of the machine and supports the seat and its springs, and to this axle the backbone is permanently connected. My invention differs from the foregoing, in that I employ an open-front bow-frame made of one piece bent to shape, and to this the spine is permanently connected.

Having now set forth the nature of my invention and explained the manner of carrying the same into effect, I wish it to be understood that I claim—

1. In a tricycle, an open-front bow-frame, A, of one piece, bent to shape, extending forward and downward, the axles of the driving-wheels and the bearings of the crank-shaft being attached thereto, and the spine A' permanently connected to the same, in combination with the rear steering-wheel and its guiding mechanism, the two driving-wheels D, and a crank-shaft and chain-wheels for operating the driving-wheels D, substantially as set forth.

2. In a tricycle, an open-front bow-frame, A, of one piece, bent to shape, extending forward and downward, the axles of the driving-wheels and the bearings of the crank-shaft being attached thereto, and the spine A' permanently connected to the same, in combination with the rear steering-wheel and its guiding mechanism, the two driving-wheels D, a crank-shaft, B, and pedals upon the same, the chain-wheels E F, chains F', clutch G, and mechanism, substantially as specified, for engaging or disengaging the chain-wheels F and driving-wheels D, substantially as and for the purposes set forth.

JOHN KEMP STARLEY.

Witnesses:
W. H. HARRIS,
*Notary Public, Birmingham.*
F. BAXTER,
*His clerk.*